United States Patent [19]

Kunimitsu et al.

[11] Patent Number: 4,755,834

[45] Date of Patent: Jul. 5, 1988

[54] THERMAL TRANSFER PRINTER

[75] Inventors: Michio Kunimitsu, Yawata; Hiroshi Tomita, Kyoto, both of Japan

[73] Assignee: Sanyo Electric Co., Ltd., Osaka, Japan

[21] Appl. No.: 897,110

[22] Filed: Aug. 15, 1986

[30] Foreign Application Priority Data

Aug. 20, 1985 [JP] Japan ................................ 60-182402

[51] Int. Cl.[4] ........................... G01D 15/10; B41J 3/20

[52] U.S. Cl. ................................ 346/76 PH; 400/120

[58] Field of Search ..................... 346/76 PH; 400/120

[56] References Cited

U.S. PATENT DOCUMENTS 4,586,834 5/1986 Hachisuga et al. ................. 400/120

FOREIGN PATENT DOCUMENTS 58-140266 8/1983 Japan .

*Primary Examiner*—E. A. Goldberg
*Assistant Examiner*—Gerald E. Preston
*Attorney, Agent, or Firm*—James D. Hall

[57] ABSTRACT

A thermal transfer printer of this invention is provided with recording paper carrier rollers disposed on both the upstream side and the downstream side of the thermal transfer head along the paper carrying direction and, further, with a sensor for detecting as to whether or not the recording paper is present on the downstream side lower than the carrier roller disposed on the downstream side along the paper carrying direction. In setting the recording paper for the first time, initial position setting of the recording paper depends on detection of the arrival of the foremost end of the paper at the carrier roller on the downstream side and, when the sensor detects the absence of the paper in the backward carrying thereof after completing the printing with one color, control for stopping backward carrying is performed. Accordingly, in the printer of this invention, because of tight contact between the recording paper and the platen, a relative position of the thermal transfer head to the recording paper is constantly definite and a possibility that the recording paper slips off the carrier roller due to excessive rewinding is avoided.

4 Claims, 16 Drawing Sheets

THERMAL TRANSFER PRINTER

FIELD OF THE INVENTION

This invention relates to a thermal transfer printer for color printing and, in particular, to a thermal transfer printer for color printing on a recording paper by using an ink sheet having sequential segments of ink of three primary colors or four colors including black.

DESCRIPTION OF THE PRIOR ART

A thermal transfer printer used as an output printer in the computer system, word-processor, and the like is readily capable of color printing by the application of ink of several different colors to the same page of the same printing medium. Thus, this printer can be used for outputting such data as displayed by the so-called computer graphics or to produce multi-color images.

A thermal transfer printer capable of color printing as described above has been disclosed in, for example, the Japanese Patent, Laid-open No. 58-140266 (1983).

In the thermal transfer printer such as above, generally, an ink sheet having sequential segments of ink in four colors including three primary colors (yellow, magenta, and cyan) and black and a recording paper are put one upon another and carried to a contact position between a thermal transfer head and the platen so that all colors of ink are thermally transferred to the recording paper in succession. Each time that printing in one color is completed, the recording paper is reversed, then brought forward and again printed in the succeeding color on the same page as that previously printed, the repeat of such process providing multi-color printing.

This type of thermal transfer printer, however, has a problem in that, if the recording paper is not in tight contact with the platen at the printing position in which the recording paper is subjected to printing with the thermal transfer head, that is, at the position in which the thermal transfer head is pressed against the platen, the relative position of the recording paper to the thermal transfer head is indefinite when the thermal transfer head is pressed to the platen. This results in the overlap of the image or of the colors. In addition, because of the need to press the thermal transfer head to the platen as described above, high quality printing cannot be obtained with this type of thermal transfer printer. In order to prevent such misalignment, some thermal printers have been provided with carrier rollers and pinch rollers pressed to the carrier rollers which are disposed at both sides of the contact position between the thermal transfer head and the platen, being on the upstream and downstream sides along the carrying direction of the recording paper. These rollers have been utilized in order to maintain tight contact between the recording paper and the platen while holding the recording paper and preventing the paper from slacking and wrinkling by the above said rollers.

In the structure described above, there is a possibility that, when the recording paper is initially set on the printer, printing is performed while the front end of the recording paper is not being held between the carrier roller and the pinch roller on the downstream side, or that, when the recording paper is rewound after completing the printing with one color, over rewinding occurs, which causes the front end of the paper to run beyond the carrier roller on the downstream side and to slip off therefrom.

In such circumstances, if the platen lies apart from the thermal transfer head, the recording paper is released from the platen and a relative position of the recording paper to the thermal transfer head is always indefinite each time that the thermal transfer head is pressed to the platen. As a result, it is inevitable that positions for starting printing in each color are delicately different from each other, making high quality color printing very difficult to achieve.

SUMMARY OF THE INVENTION

This invention was initiated to overcome the problem described above, and the primary object thereof is to provide a thermal transfer printer capable of positioning the recording paper exactly every time that the platen and the thermal transfer head are pressed to each other while maintaining secure positioning of the recording paper by the carrier rollers and the pinch rollers on both sides of the printing position of the thermal transfer head.

Another object of this invention is to provide a thermal transfer printer which ensures exact positioning of the recording paper by preventing the recording paper from being wound backward so far that it causes release of the foremost end of the paper from the carrier roller and the pinch roller.

The thermal transfer printer of this invention for color printing in which an ink sheet having ink of a plurality of colors sequentially imprinted thereon and a recording paper are put one upon another and inserted into a contact position between the thermal transfer head and the platen so as to be subjected alternately to thermal transfer printing with each color when carrying in the forward direction and to carrying in the reverse direction, characterized by being provided with a first recording paper carrier roller exerting carrying force upon the recording paper at the upstream side of a contact position between said thermal transfer head and the platen along the paper carrying direction and a second recording paper carrier roller exerting carrying force upon the recording paper at the downstream side of the same; a first sensor for detecting the recording paper disposed on the upstream side of said first recording paper carrier roller along the paper carrying direction; a second sensor for detecting the recording paper disposed on the downstream side of said second paper carrier roller along the paper carrying direction; and a control unit which controls the driving of said first and second paper carrier rollers in such manner as; carrying the recording paper in the forward direction in response to detection of the recording paper by said first sensor when printing on one page of the recording paper is started; performing subsequent processes on the assumption that the recording paper is set in the initial position when said second sensor detects the recording paper during the carrying of the recording paper in the forward direction; and stopping the carrying of the recording paper when said second sensor detects absence of the recording paper during the carrying of the recording paper in the backward direction after completing the printing on said one page of the recording paper in one color.

The above and further objects and features of the invention will more fully be apparent from the following detailed description with accompanying drawings.

DESCRIPTION OF THE PREFERRED EMBODIMENT

A description of this invention will be made with reference to the drawings showing the preferred embodiment of this invention.

Figure 1:
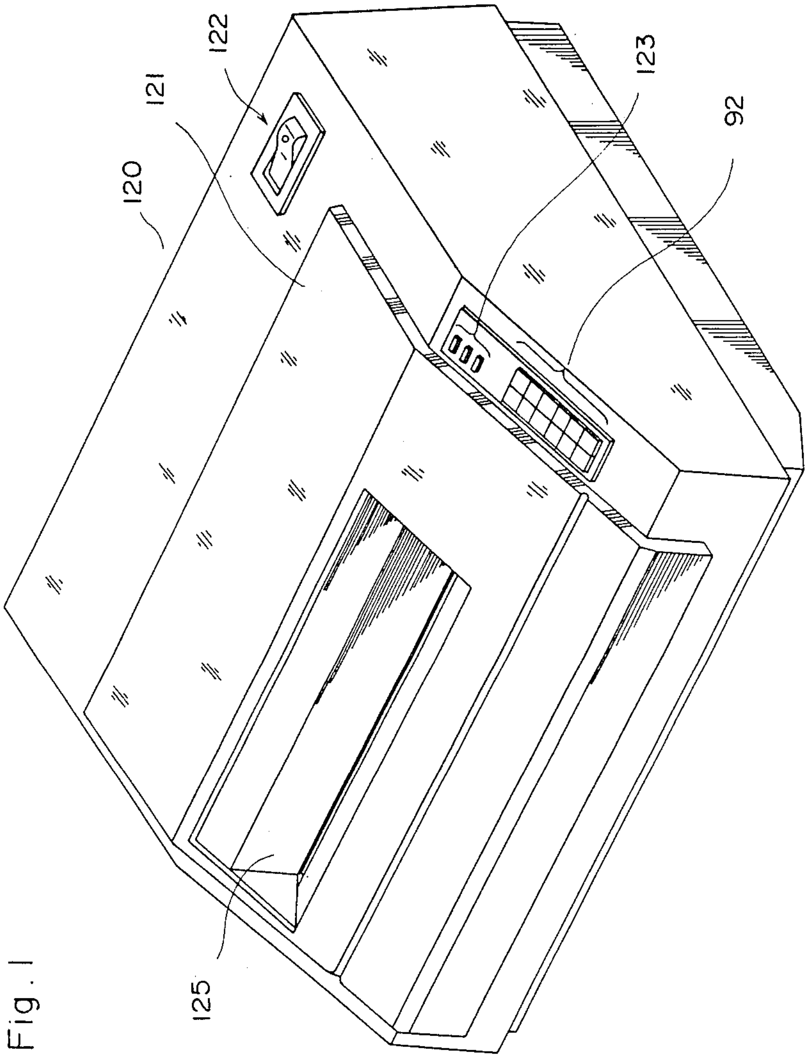
FIG. 1 is a perspective view showing the appearance of a thermal transfer printer of this invention.

FIG. 1 is a perspective view showing the appearance of a thermal transfer printer of this invention. Mechanical structural elements of the thermal transfer printer of this invention are contained in a roughly box-like casing 120. The printer is provided with a main switch 122 disposed on the upper rear end of the casing 120, an indication part 123 having various indicators, a key board 92 having various instruction keys disposed on the front right side, and a cover 121 for covering the central portions of the upper front sides throughout. An outlet 125 for the printed recording paper is provided on the upper surface of cover 121.

Figure 2:
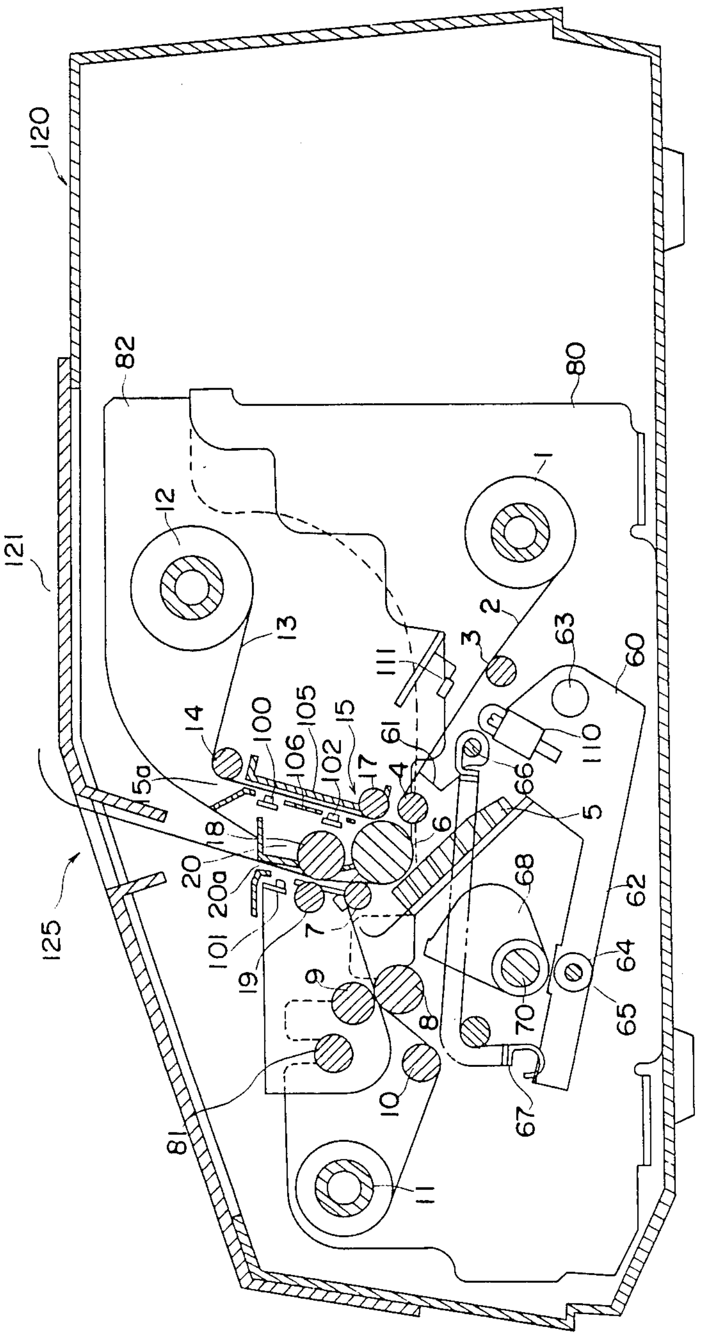
FIGS. 2 and 3 are sectional side views showing the mechanical structure thereof.
Figure 3:
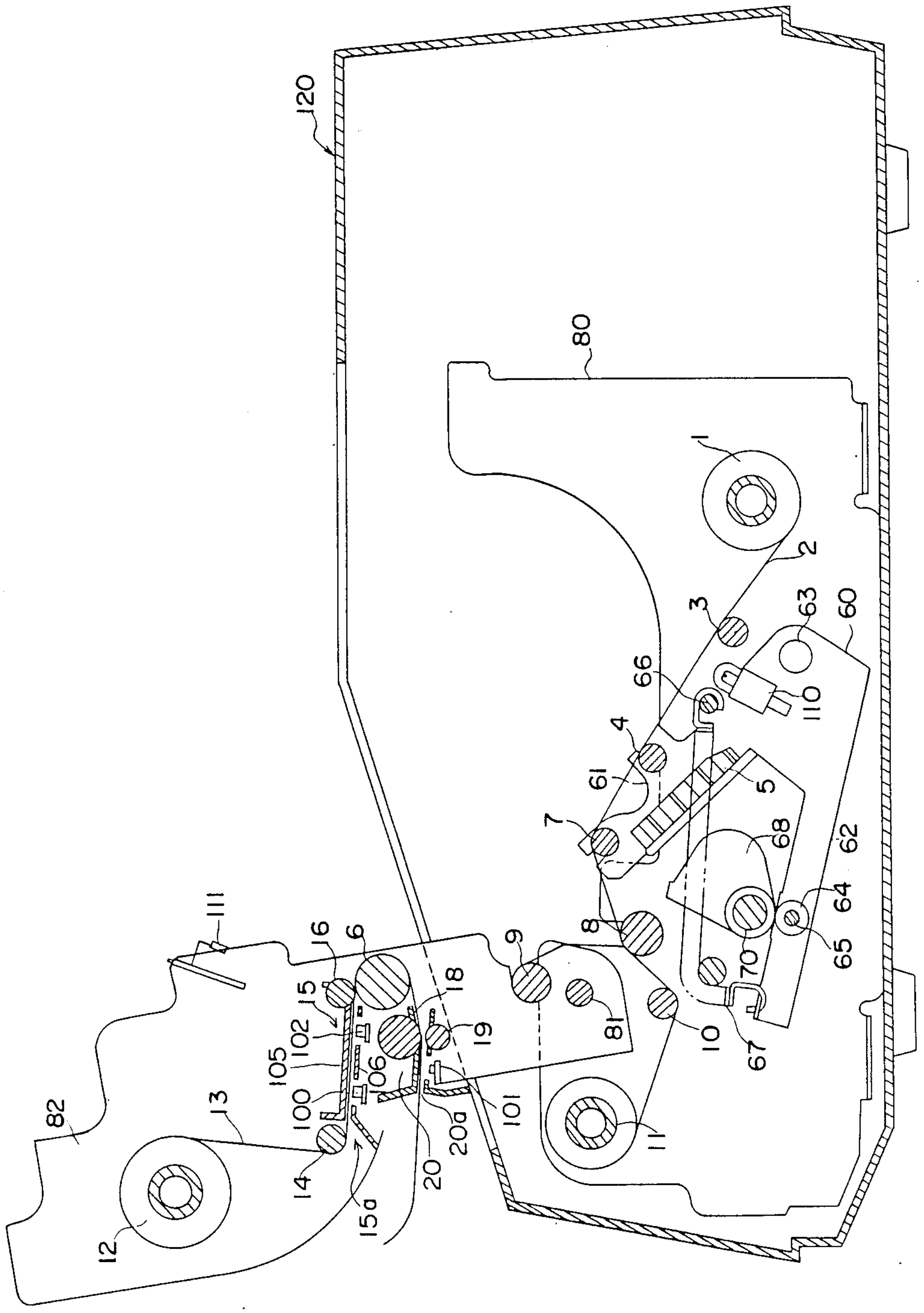

FIGS. 2 and 3 are sectional side views of a mechanical structure of the thermal transfer printer of this invention, showing a condition in which the thermal transfer head 5 and the platen 6 are pressed to each other and the other condition in which an upper part including the platen 6 is opened.

The main component members of this thermal transfer printer are fixed to a pair of stationary side plates 80 and 80 suitably fixed to the interior of the casing 120 upright on the right and left sides to be parallel with each other and also to a pair of movable side plates 82 and 82 lying above the stationary side plates 80 and 80 to be parallel with each other along the front-to-back direction (the direction of carrying the ink sheet 2 and the recording paper 13 as will be described later), being pivotally fixed to the stationary side plates 80 and 80.

Between the stationary side walls 80 and 80 and near the rear ends thereof (the right side on every drawing), is provided a supply roll 1 having the ink sheet 2 wound therearound; at the central parts of the stationary plates 80 and 80, a bracket 60 having the thermal transfer head 5 fixed thereto; at the front upper parts (the left side on every drawing), a take-up roll 11 for the ink sheet 2; in a position between the bracket 60 and the take-up roll 11, an ink sheet carrier roller 8 for carrying the ink sheet 2; and at the lower central parts of the stationary plates 80 and 80, a cam supporting shaft 70 being fixed an eccentric cam 68 whose rotational center lies on a pivot of a segment. Further provided are: a guide shaft 3 for the ink sheet supply roll 1 and the platen 6; a second head guide shaft 7 between the platen 6 and the ink sheet carrier roller 8; and a guide shaft 10 between the ink sheet carrier roller 8 and the take-up roll 11.

The ink sheet carrier roller 8 is driven by an electric driving motor 30 as will be described later (see FIGS. 4 and 5). The rotational speed of roller 8 for carrying ink sheet 2 is synchronized with the carrying speed for the recording paper 13 as will be described later.

The movable side plates 82 and 82 are pivotally supported at one end thereof at an axis 81 of rotation provided on the upper front parts of the aforesaid stationary side plates 80 and 80. This permits the platen 6 and the thermal transfer head 5 to be pressed to each other with the other ends thereof turned backward in the normal state of operation. In other words, the movable plates 82 and 82, when put int a state of use, are provided with: a recording paper roll 12 having the recording paper 13 wound therearound, disposed near the rear ends of the side plates (near the other ends of the casing 120); a slit-like sheet inserting passage 15 formed by guide plates 105 and 106 depending almost vertically from the guide shaft 14 in the middle portion of a space interposed between the movable side plates 82 and 82; an upwardly directed recording paper discharging passage 20 formed by the second paper carrier roller 18 and the second pressing roller 19 facing each other so that the discharge passage is roughly parallel with the recording paper inserting passage 15; a platen 6 in the form of a roller further serving as a first recording paper carrier roller disposed between the lower end parts of the inserting passage 15 and of the discharging passage 20, as well as a first pressing roller 17; and another pressing roller 9 disposed slightly behind the axis of rotation 81 lying on the front side.

A pressing position of the first pressing roller 17 against the platen 6, serving as the first carrier roller, lies on the upstream side along the carrying direction for the recording paper above a contact position produced when the thermal transfer head 5 is pressed to the platen 6 (also a position of a line of heating elements of the thermal transfer head 5). Therefore, an acting position of carrying force exerted by the platen 6 as the first recording paper carrier roller upon the recording paper lies on the upstream side along the carrying direction for the recording paper 13 above the pressing position of the thermal transfer head 5 to the platen 6.

The upper end of the inserting passage 15 and that of the discharging passage 20 lead to an inlet opening 15*a* for the recording paper 13 undergoing change of running direction thereof at the guide shaft 14 and to an outlet 20*a* for discharging the recording paper 13 toward a discharging opening 125 of the cover 121 of the casing 120, respectively.

A positional relation between parts to be arranged when the printer is in use (a state as shown in FIG. 2) is fixed so that the pressing roller 9 and the ink sheet carrier roller 8 on the side of the stationary side plates 80 and 80 are pressed to each other at the same time that the platen 6, as the first recording paper carrier roller, and the thermal transfer head 5 are pressed to each other.

A first sensor 100 is provided in a position relatively near the upper end (near insertion opening 15a) of the inserting passage 15; a third sensor 102, in a relatively lower position (near the platen 6) between the first sensor and the platen 6 in the insertion passage 15, and a second sensor 101, in a position relatively near the upper part (near discharging outlet 20a) of the discharging passage 20. The first and the second sensors 100 and 101 are photo-sensors for detecting whether the recording paper is present or not, and the third sensor 102 is a photo-sensor for detecting a mark indicating a printing start position impressed on the recording paper 13.

The printing start position mark is used as a basis for setting a position from which printing with each color of the ink sheet 2 on the recording paper 13 is started.

A color sensor 111 is fixed to the movable side plates 82 and 82 at a position intermediate platen 6 and the ink supply roll 1. Further, a light source 110 for the color sensor 111 is fixed at the position of the plate brackets 60 and 60 opposite the color sensor 111 and interposed by the carrying passage for the ink sheet 2.

When the movable side plates 82 and 82 are turned counterclockwise around a shaft 81 with the cover 121 removed as shown in FIG. 3 to be put into an open state, the ink sheet supply roll 1 and the ink sheet 2 are exposed to a wide open space above the casing 120 and the ink sheet supply roll 1 is readily inserted or replaced.

When the movable side plates 82 and 82 are turned as described above, the platen 6 is removed from its position adjacent thermal transfer head 5. However, clockwise rotation of the thermal transfer head 5 by the spring 67 around a shaft 63 is prevented by the contact of lower branch parts 62 and 62 of the plate brackets 60 and 60 with a cam supporting shaft 70. Accordingly, there is no possibility that the thermal transfer head 5 may obstruct the movement of side plates 82 and 82.

Figure 4:
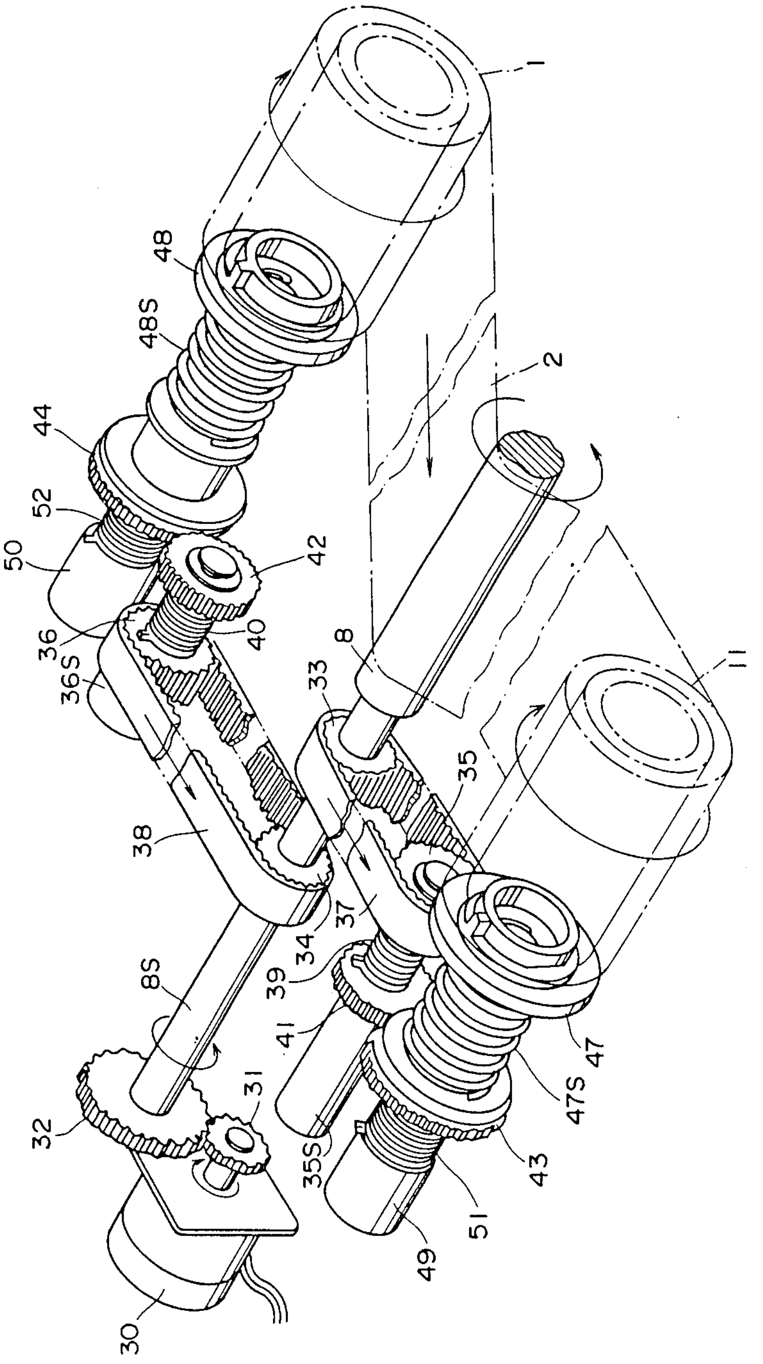
FIG. 4 is a fragmentary perspective view of the structure of the carrying system for the ink sheet.
Figure 5:
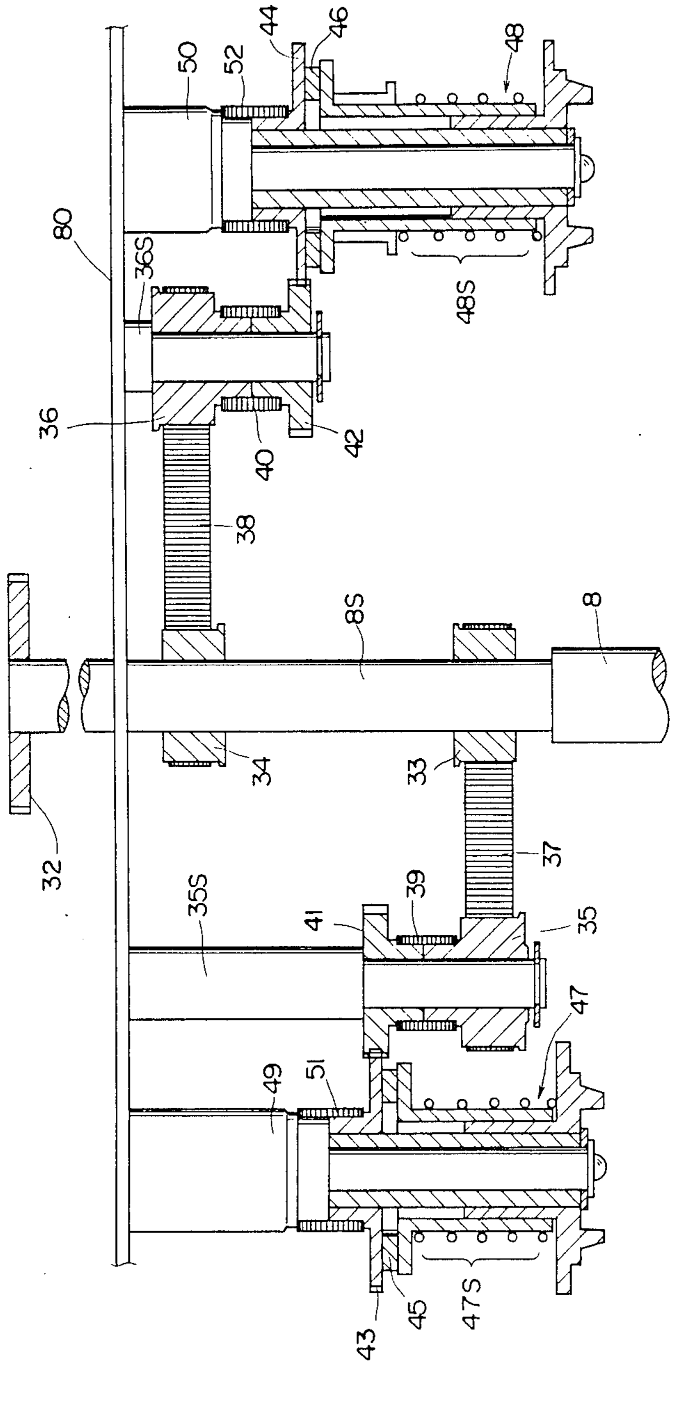
FIG. 5 is a plan view thereof.

FIGS. 4 and 5 are a fragmentary perspective view and a plan view, respectively, of a main parts composing a carrying system for the ink sheet 2.

The electric driving motor 30 used in this printer is a pulse motor capable of rotating in either direction and mounted with a spur gear 31 at the output shaft. The spur gear 31 meshes with another spur gear 32 fixed to a shaft 8S pivoted by the stationary side plates 80 and 80. The shaft 8S is mounted with spur gears 34 and 33 disposed in succession from a position near the spur gear 32 and a part thereof closer to the front end is formed of a larger diameter to work as an ink sheet carrier roller 8.

A cogged belt 37 having teeth corrugated on its inner periphery is extended between the spur gear 33 and an idler gear 35 idly mounted on a shaft 35S fixed to the side plate 80 and spaced from the shaft 8S at an approximate distance. Another similar cogged belt 38 is extended between the spur gear 34 and an idler gear 36 idly mounted on a shaft 36S fixed to the side plate 80 and spaced from the shaft 8S at an appropriate distance. The idler gear 35 is connected to an idler gear 41 idly mounted on the shaft common thereto through a spring clutch 39. Another idler gear 36 is connected to an idler gear 42 idly mounted on the shaft common thereto through a spring clutch 40.

The spring clutch 39 transmits rotation of the idler gear 35 to the idler gear 41 only when the idler gear 35 turns counterclockwise on FIG. 4. The spring clutch 40 transmits rotation of the idler gear 36 to the idler gear 42 only when the idler gear 36 turns clockwise on FIG. 4.

The idler gears 41 and 42 mesh with idler gears 43 and 44 idly fitted onto shafts 49 and 50 fixed to the stationary side plates 80 and spaced at appropriate distances from shafts 35S and 36S, respectively.

The idler gears 43 and 44 are provided with spring clutches 51 and 52 on the root sides of shafts 49 and 50, respectively. The spring clutch 51 operates for intercepting rotation of the idler gear 43 in the counterclockwise direction on FIG. 4 whereas another spring clutch 42 operates for intercepting rotation of the idler gear 44 in the clockwise direction.

Friction rings 45 and 46 as well as holding reels 47 and 48 for the ink sheet take-up roll 11 and for the ink sheet supply roll 1, respectively, are idly fitted on the front end sides of the idler gears 43 and 44 on the end parts of the shafts 49 and 50, respectively. Both reels 47 and 48 press the friction rings 45 and 46 toward the idler gears 43 and 44 by means of coiled springs 47s and 48s provided for both reels, respectively.

Performance of the driving system thus constructed for the carrying of the ink sheet 2 is fully described in our co-pending Application Ser. No. 897,193, and will not be described here.

Figure 6:
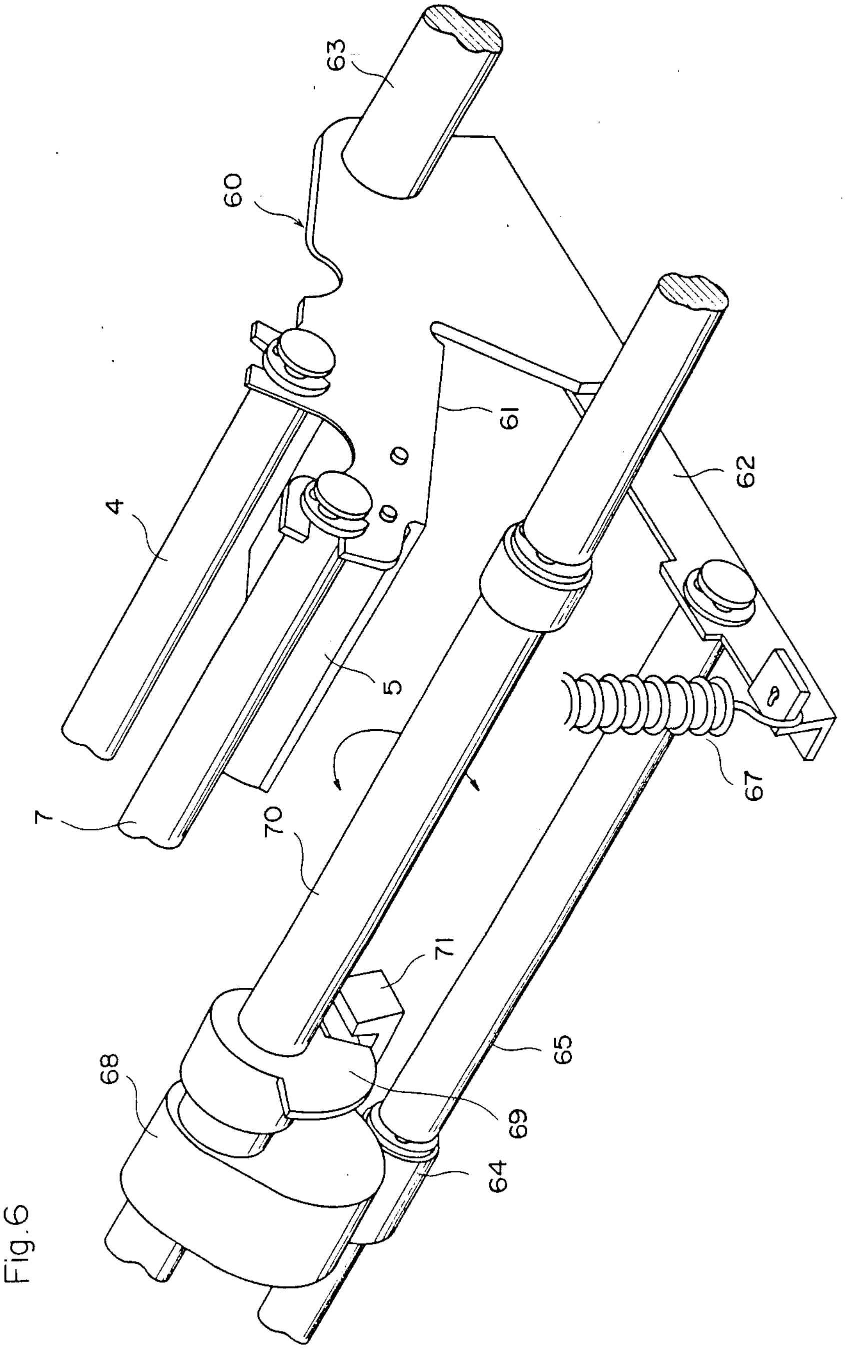
FIG. 6 is a fragmentary perspective view of a structure of a thermal transfer head and nearby parts, the major part being an eccentric cam for pressing and releasing the thermal transfer head to and from the platen.
Figure 7:
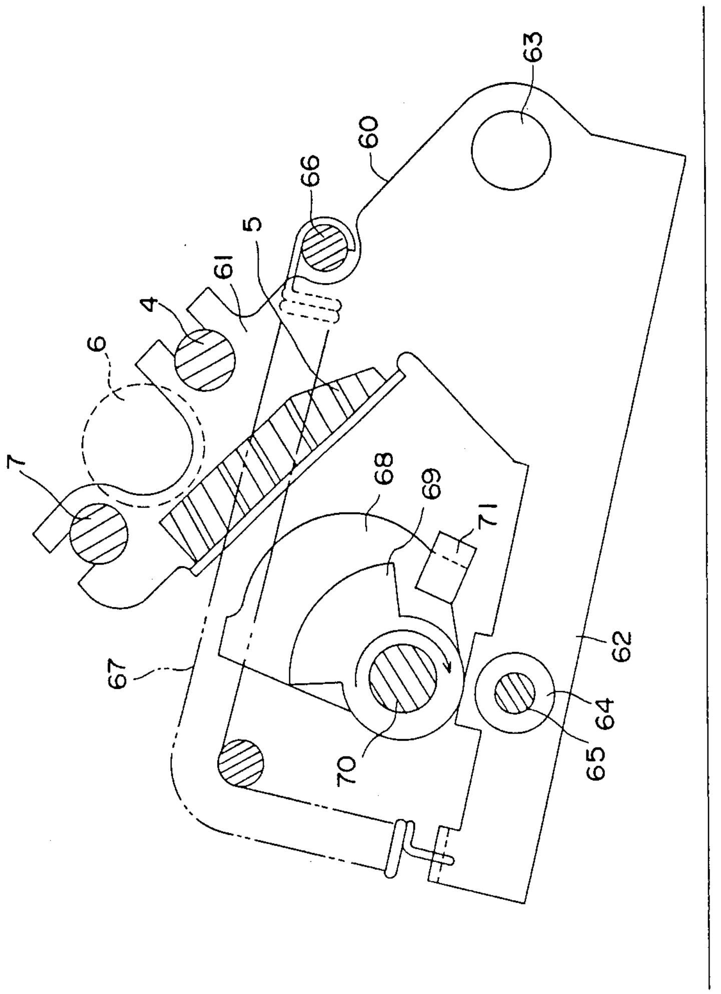
FIGS. 7 and 8 are side views thereof.
Figure 8:
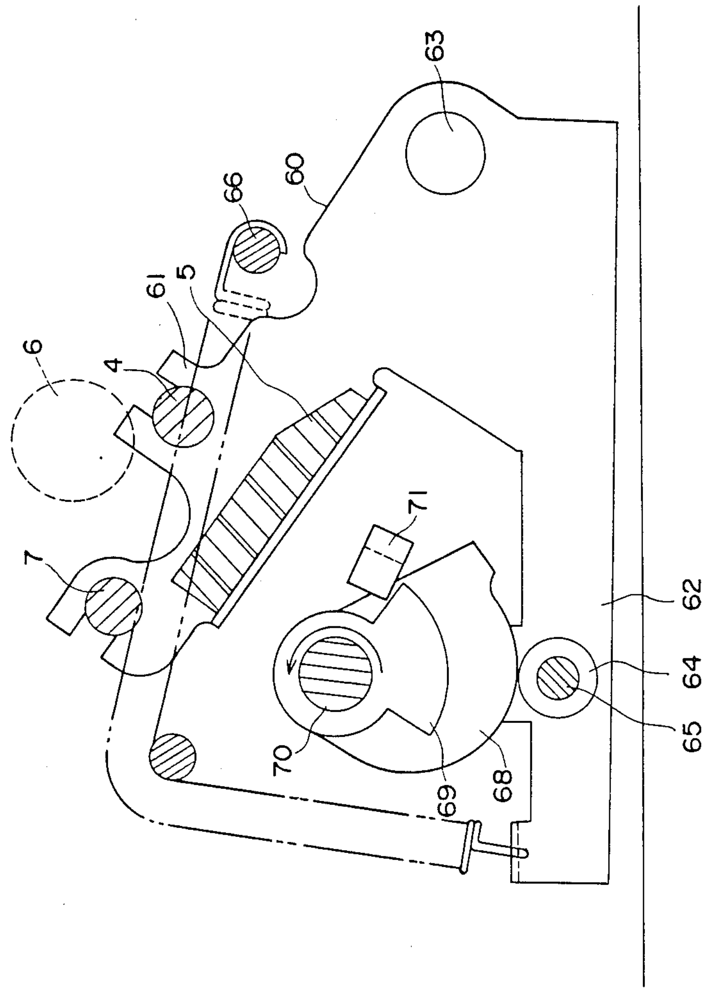

The structure around the thermal transfer head 5 of the printer of this invention, particularly, a structure for adapting the printing head 5 to be pressed or to be released from the platen 6 will described with reference to FIGS. 6, 7 and 8. FIG. 6 is a fragmentary perspective view of the structure around the thermal transfer head 5; FIG. 7 is a side view showing a state in which the platen 6 and the thermal transfer head 5 are tightly pressed together with an eccentric cam 68 set in a first position; and FIG. 8 is a side view showing a state in which the platen 6 is release from the thermal transfer head 5 with the eccentric cam 58 set in a second position.

A pair of plate brackets 60 and 60 disposed right and left for supporting the thermal transfer head 5 are each formed of an upper branch part 61 positioned above and a lower branch part 62 positioned below which extend so to be distant from each other at the front end and to provide a V-shape. Both plate brackets 60 and 60 are pivoted rotatably about a shaft 63 positioned near the stationary side plates 80 and 80 so as to be parallel with each other between the side plates 80 and 80. Further, both plate brackets 60 and 60 are made in one body with each other in order that the thermal transfer head 5, first head guide shaft 4, and second head guide shaft 7 are fixed to both upper branch parts 61 and 61. A cam pressing shaft 65 provided with a cam pressing roller 64 as a cam follower is fixed to the lower branch parts 62 and 62.

Both plate brackets 60 and 60 are urged rearwardly and upwardly (clockwise on the drawings) at the front end portion thereof to rotate around shaft 63 by tensions of the springs 67 and 67 as these members are streched between the front end of each of lower branch parts 62 and 62 and a shaft 66 fixed to both stationary side plates 80 and 80.

Positions of parts fixed between the plate brackets 60 and 60 are set in such a manner that, when the platen 6 and the thermal transfer head 5 are pressed to each other, the first and the second head guide shafts 4, 7 are disposed before and behind the platen 6, respectively.

The position of pressing roller 64 on the cam pressing shaft 65 is set to face the cam surface of the eccentric cam 68 fixed to the aforesaid cam supporting shaft 70.

A sensor shutter 69 is also fixed to the cam supporting shaft 70. A cam position sensor 71, which comprises a photo-interrupter being turned on and off by rotational position of the sensor shutter 69 when the eccentric cam 68 and the sensor shutter 69 rotate together with the rotation of the cam supporting shaft 70, is disposed on the sides of the stationary side plates 80 and 80. The cam position sensor 71 outputs: a signal "0" when the sensor shutter 69 is out of engagement with this sensor 71 on account of a positional relation that the eccentric cam 68 is in a second position where the cam surface thereof is directed downward to press the cam pressing roller 64 downward, that is, in the direction opposite to that of biasing force of the spring 67 (the thermal transfer head 5 is released from the platen 6) and is at a first position where the plate brackets 60 and 60 are urged upwardly by the springs 67 and 67 (the thermal transfer head 5 is in pressing to the platen 6) while the eccentric cam 68 is adapted to be out of contact with cam pressing roller 64 with the cam surface of the eccentric cam 68 turned upwardly; and a signal "1" when the sensor shutter 69 is in engagement with the cam position sensor 71 due to other positional relations than that described above.

Accordingly, as shown in, for example, FIG. 7, when a positional relation that the eccentric cam 68 is at the first position and the platen 6 is pressed to the thermal transfer head 5 is charged to a position where the cam surface of the eccentric cam 68 is brought into contact with the cam pressing roller 64 being turned of the cam supporting shaft 70 and the eccentric cam 68 reaches the second position with the cam pressing shaft 65 depressed lower, the plate brackets 60 and 60 are turned downward together at the front ends thereof in opposition to stretching force of the spring 67. Thus, as shown in FIG. 8, the thermal transfer head 5 is released from the platen 6.

The plate brackets 60 and 60 are also provided with a light source 110 for the color sensor 111 for sensing the colors of ink of the ink sheet 2.

Figure 9:
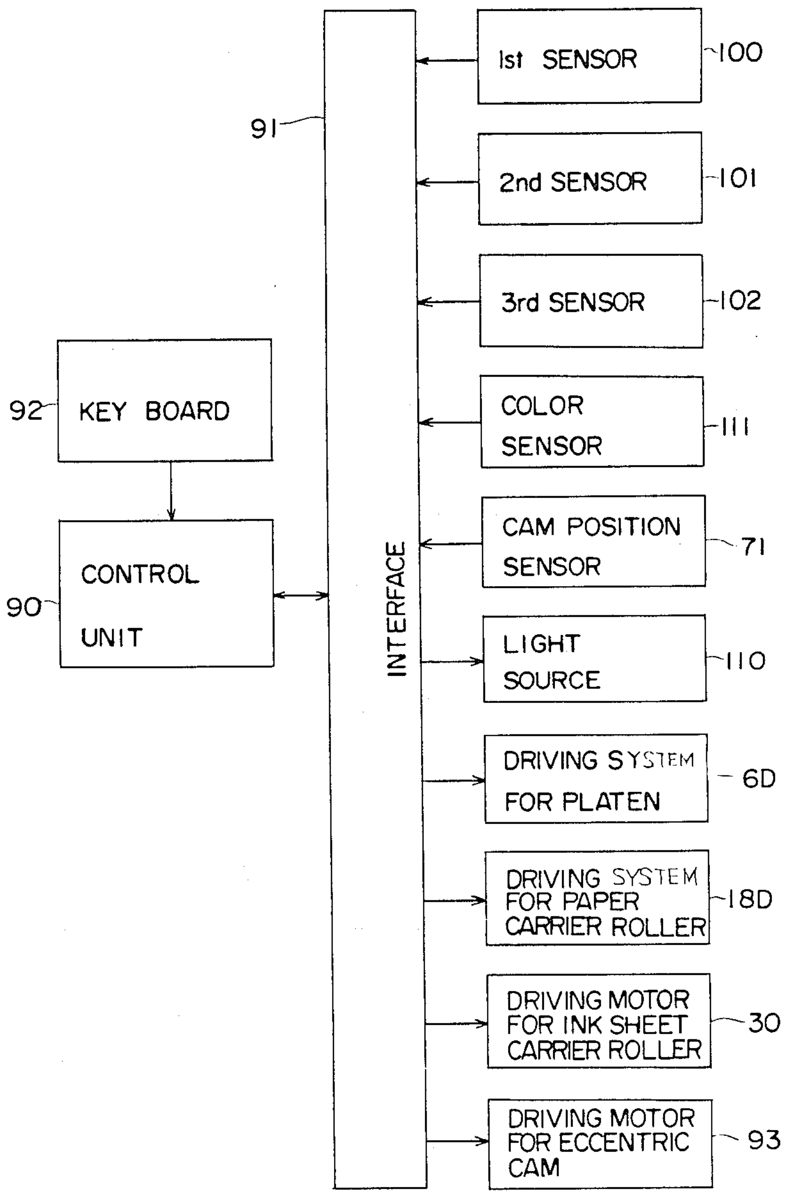
FIG. 9 is a block diagram showing a structure of a control system of the thermal transfer printer of this invention.

FIG. 9 is a block diagram showing structure of a control circuit of the thermal transfer printer of this invention.

In the drawing, the reference numeral 90 designates a microcomputer system as a control unit including CPU as a control center, and ROM containing programs for various kinds of control and RAM for memorizing various kinds of information. The control unit 90 receives various kinds of key signals from the key board 92. Further, the control unit 90, while receiving signals from the aforesaid first sensor 100, second sensor 101, third sensor 102, color sensor 111, and cam position sensor 71, provides control signals to a light source 110 for the color sensor 111, driving system 6D for the platen 6 as the first recording paper carrier roller, driving system 18D for the second recording paper carrier roller 18, driving motor 30 for the ink sheet driving system, and driving motor 93 for driving the eccentric cam through an interface 91.

In the thermal transfer printer of this invention, the eccentric cam 68 is initially set in the second position where the cam surface thereof presses the cam pressing roller 64 immediately after the power source is thrown in. In other words, in the printer of this invention, immediately after the power source is turned on, the platen 6 and the thermal transfer head 5 are always set in positions so as to be distant from each other. The sequence for initial position setting of the eccentric cam 68 by means of the control unit 90 is described in our co-pending U.S. application Ser. No. 897,382 and will not be described here.

Figure 10:
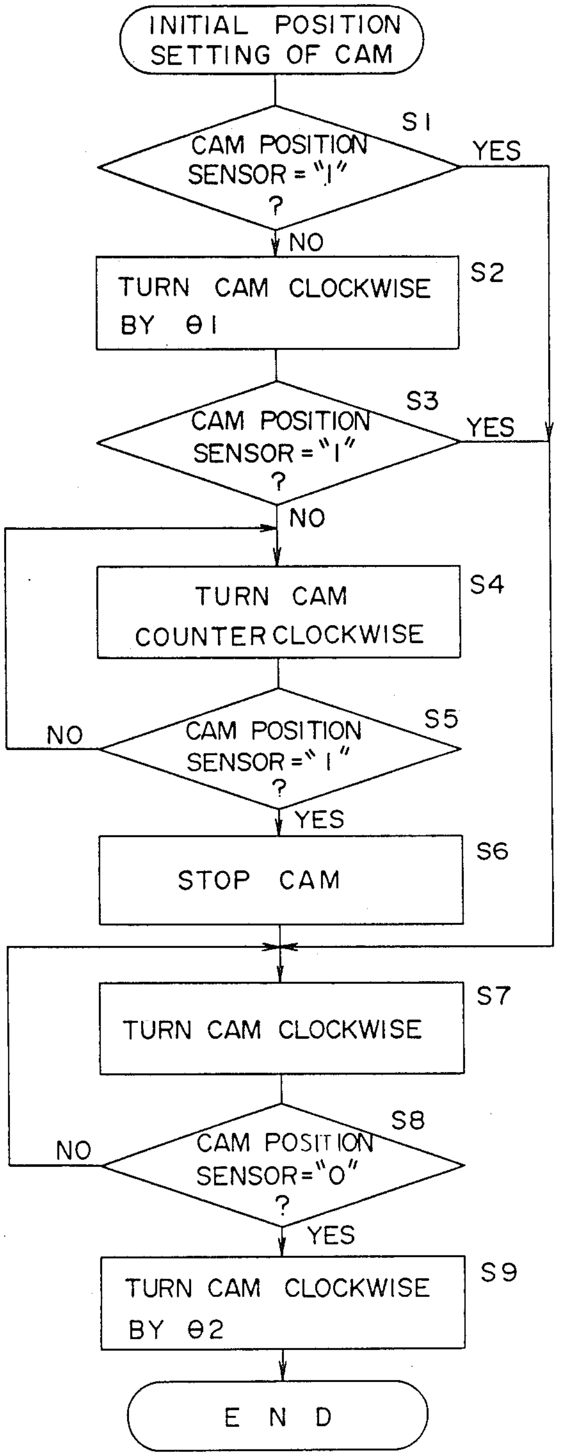
FIG. 10 is a flow chart showing the control sequence for initialization of position of the recording paper by means of the control unit.

Control for initial position setting of the recording paper 13 by means of the control unit 90 will be described with reference to a flow chart in FIG. 10.

When the eccentric cam 68 is not being set in the first position, the control unit 90 sets the eccentric cam 68 in the first position depending on the above-said control (step S31) to keep the thermal transfer head 5 pressed to the platen 6.

When the recording paper 13 is drawn from the recording paper roll 12 by the operator and the foremost end thereof is inserted into the printer through the insertion opening 15a and positioned on the contact part between the platen 6 as the first paper carrier roller and the first pressing roller 17, the first sensor 100 detects the recording paper 13 and outputs a predetermined signal "1" to the control unit 90 (step S32). In the case where the first sensor 100 detects absence of the recording paper 13, an indication as "paper out" is displayed on the indication part 123 of the casing 120 (step S38).

When a recording paper carrier switch placed on the key board 92 is turned on while only the first sensor detects the recording paper 13 (step S34), the platen 6 and the paper carrier roller 18 are driven clockwise respectively. Thus, the recording paper 13 is carried from the contact part between the platen 6 and the first pressing roller 17 to another contact part between the platen 6 and the thermal transfer head 5 and further to still another contact part between the paper carrier roller 18 and the second pressing roller 19 (step S35) until the second sensor 101 detects the recording paper 13 and outputs a signal "1" (step S33).

In this way, the recording paper 13 is further carried after the foremost end thereof is detected by the second sensor 101 (step S34). When the detection signal "1" is outputted to the control unit 90 (step S36) with detection of a printing start position mark impressed on the recording paper 13 by the third sensor 102, the control unit 90 further carries the recording paper 13 by a predetermined length (step S37) so as to bring the actual printing start position on the recording paper into adjustment with a printing position of the thermal transfer head 5.

Since initial position setting for the recording paper 13 as above is performed in a state that the thermal transfer head 5 is pressed to the platen 6, that is, the eccentric cam 68 is set in the first position, so the ink sheet 2 is also carried in the forward direction by the same length as that of the recording paper 13. Therefore, if the above state continues as it is, a length of the ink sheet 2 carried during initial position setting of the recording paper 13 is useless and, in view of this drawback, rewinding of the ink sheet 2 in the thermal transfer printer of this invention is so designed as to be performed at the time of position adjustment of the ink sheet 2.

Figure 11A:
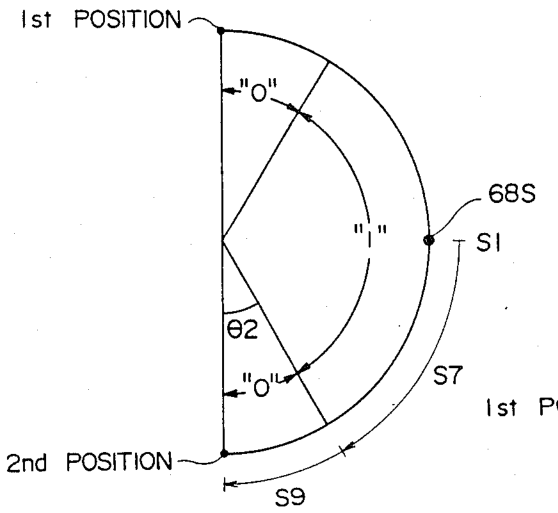
FIG. 11 is a flow chart showing the control sequence for adjustment of position of the ink sheet by means of the control unit.
Figure 11B:
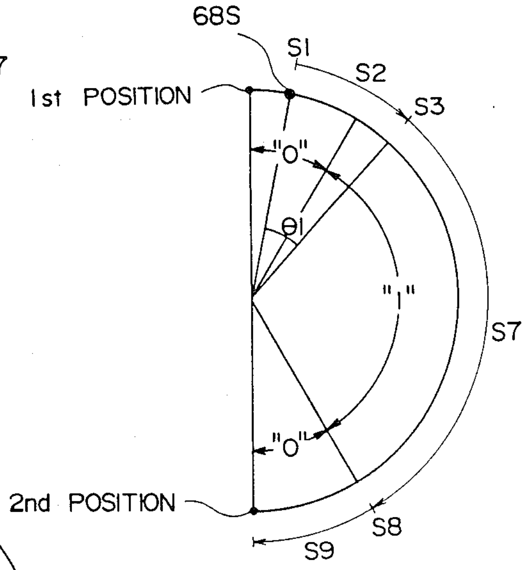
Figure 11C:
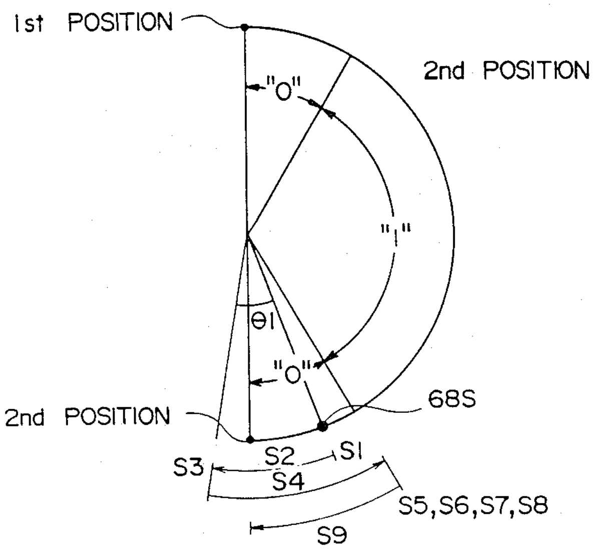

FIG. 11 is a flow chart showing a sequence of the control unit 90 in position adjustment of the ink sheet 2.

Position adjustment of the ink sheet 2 is to bring the foremost end of each section of ink sheet 2 having four colors as yellow: Y, magenta: M, cyan: C, and black: B face sequentially into exact adjustment with respective printing positions (positions for line of heating elements of the thermal transfer head 5). Position adjustment of the ink sheet 2 is carried out in an initial state immediately after turning-on the power source and prior to printing with a section in one color following the finish of printing with the preceding color.

Control of position adjustment of the ink sheet 2 is performed by the control unit 90 on the basis of a detection signal obtained from the color sensor 111 which detects light rays passing through the ink sheet 2 emitted from the light source 110 disposed to face the sensor 111 with the carrying passage for the ink sheet 2 interposed therebetween. As a color sensor for the use as above, for example, an amorphous integrated full color sensor as disclosed in the Japanese Patent, Laid-Open No. 58-125865 (1983) is suitable. The color sensor disclosed therein is so composed as to provide three bits of signals in response to the color of light received thereby.

For position adjustment of the ink sheet 2, the control unit first performs control for setting the eccentric cam 68 in the second position to release the thermal transfer head 5 from the platen 6 (step S41). Since the ink sheet 2 is carried in the forward direction by a length equal to that of the recording paper carried at the time of initial position setting of the recording paper 13, the control unit 90 performs control to drive the driving motor 30 in the opposite direction and carries the ink sheet 2 in the opposite direction by a length as described above (step S42).

The control unit 90 then turns on the light source 110 (step S43). At this time, if the required color (yellow at the time of initial setting) is detected, the control unit 90 drives the driving motor 30 to carry the ink sheet 2 step by step in the forward direction until the color is not detected (steps S44 and S45). Afterward, the control unit 90 drives the driving motor 30 to carry the ink sheet 2 step by step in the forward direction until the required color is again detected (S46 and S47). When the required color is detected at steps 45 above, the detected position is not proved to be the foremost end position of a section having the very required color, however, since the other color is detected afterward and the other section having the other color is carried in the forward direction until the required color is again detected, the foremost end position of the section having the required color is substantially detected.

Subsequently, the control unit 90 turns off the light source 110 (step S48) and completes the process of position adjustment of the ink sheet 2.

When the recording paper 13 and the ink sheet 2 are separately subjected to initial position adjustment as above, the control unit 90 performs control to set the eccentric cam 68 in the first position so that the thermal transfer head 5 presses to the platen 6, and carries the recording paper 13 and the ink sheet 2 while synchronizing carrying speeds for the ink sheet 2 and recording paper 13. In such a state as above, control over heat generation at a line of heating elements of the thermal transfer head 5 provides thermal transfer printing with one color, for example, yellow.

Figure 12:
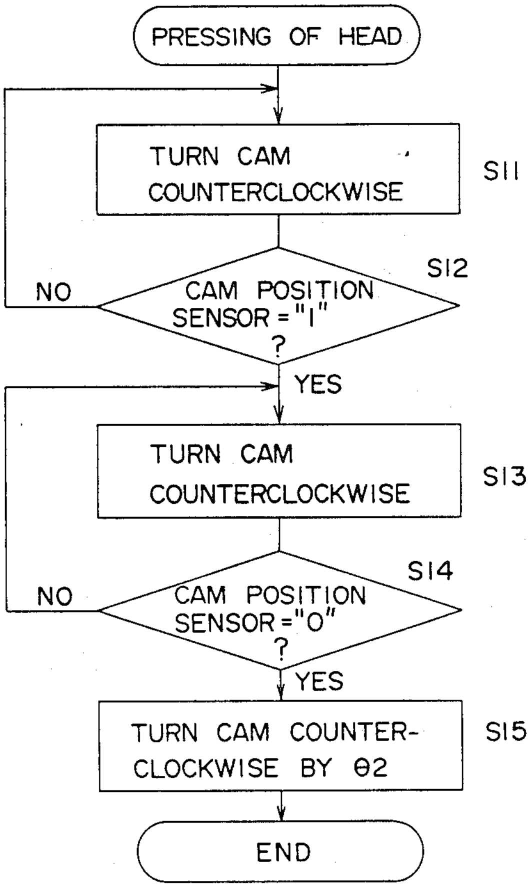
FIG. 12 is a flow chart showing the control sequence for backward carrying of the recording paper by means of the control unit after completing the printing with the color.
Figure 13:
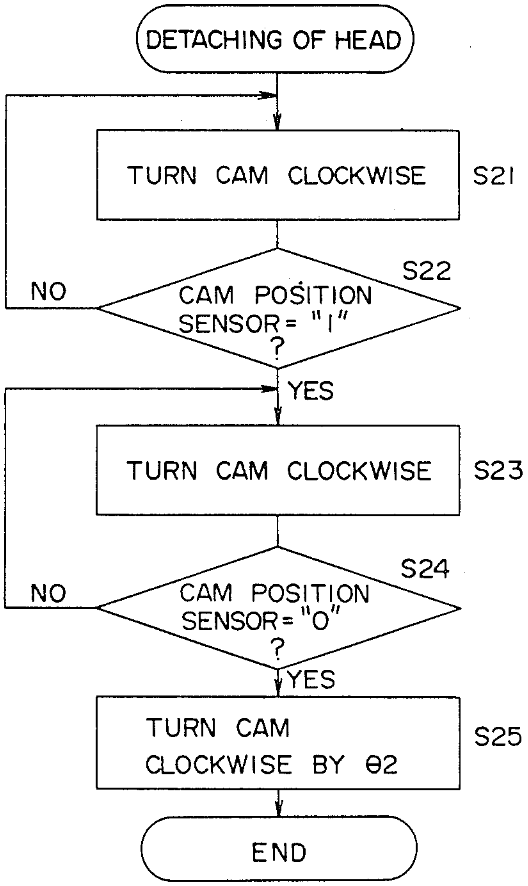
Figure 14:
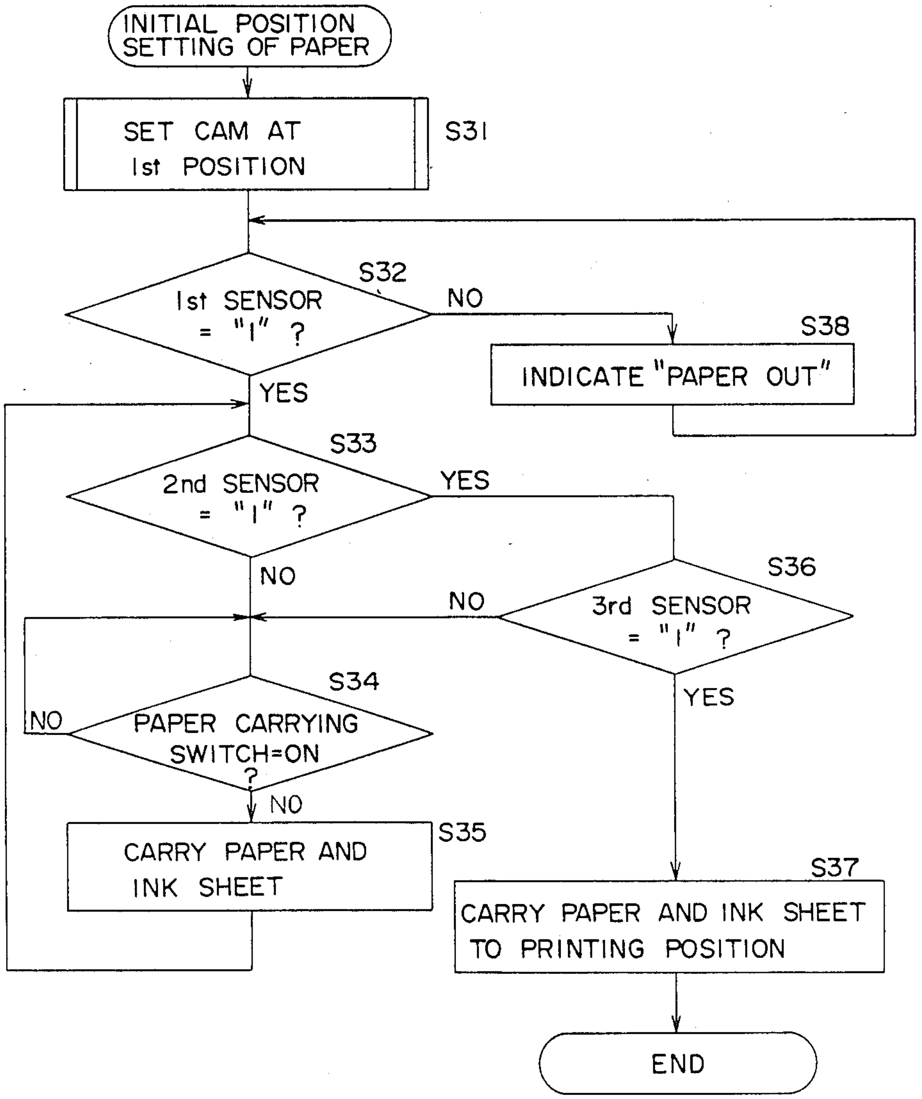
Figure 15:
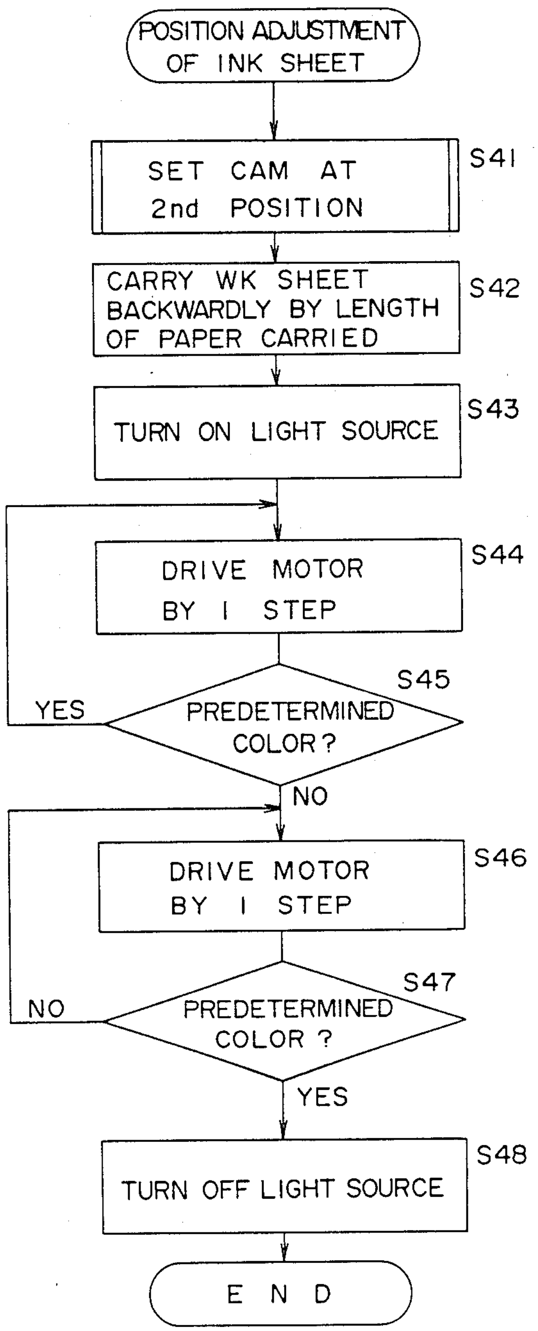
Figure 16:
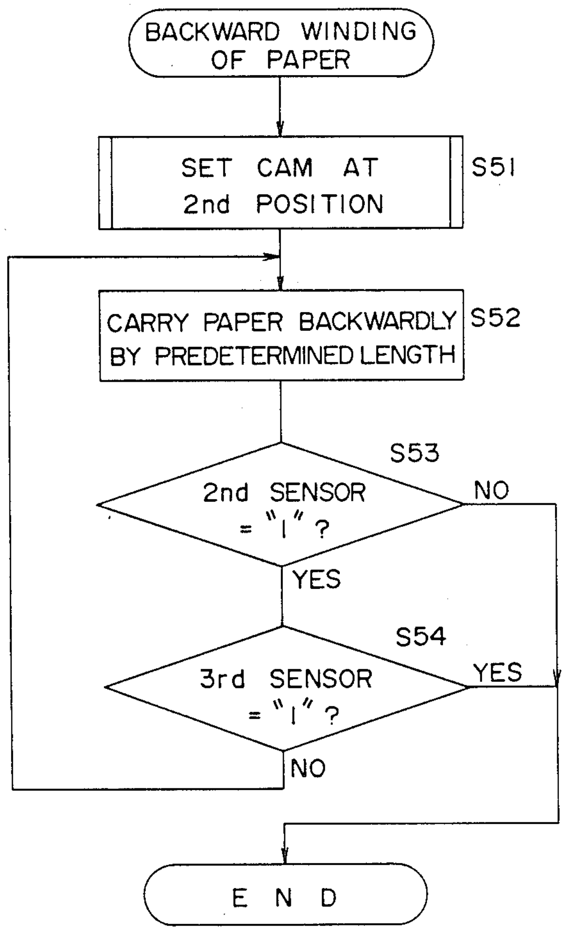

Subsequently to the completion of thermal transfer printing in yellow ink as a first-color ink, the recording paper is rewound. FIG. 12 is a flow chart showing a sequence of control over rewinding of the recording paper 13 by means of the control unit 90.

The control unit 90 operates to release the thermal transfer head 5 from the platen 6 (to set the eccentric cam 68 in the second position) (step S51). The control unit 90 then rewinds the recording paper 13 step by step, that is, carries the recording paper 13 in the reverse direction (steps S52, S53, and S54) until the foremost end of the recording paper 13 is detected by the second sensor 101, that is, the foremost end of the recording paper 13 is carried to the side of the platen 6 beyond the detecting position for the second sensor 101, or the printing start position mark on the recording paper 12 is detected by the third sensor 102. Usually, the printing start position mark on the recording paper 13 is first detected by the third sensor 102 through the above-said process and, therefore, initial position setting of the recording paper 13 is possible after the above-said detection.

In the result that the printing start position mark cannot be detected by the third sensor 102 for some reasons during the carrying of the recording paper 13 in the reverse direction, detection of the foremost end of the recording paper 13 by the second sensor 101 prevents the foremost end of the recording paper 13 from being carried in the reverse direction beyond the contact part between the paper carrier roller 18 and the second pressing roller 19. Accordingly, excessive rewinding of the recording paper 13 to slip off the contact part between the paper carrier roller 18 and the second pressing roller 19 is prevented. Even in such a case as excessive rewinding of the recording paper 13, initial position setting as described above can be performed accurately.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds thereof are therefore intended to be embraced by the claims.

What is claimed is:

1. A thermal transfer printer, for color printing in which an ink sheet having ink of a plurality of sequential color faces and a recording paper are put one upon another and inserted into a contact position between the thermal transfer head and the platen so as to be subjected alternately to thermal transfer printing with each color having means for carrying in the forward direction and for carrying in the reverse direction, being provided with

- a first recording paper carrier roller exerting carrying force upon the recording paper at the upstream side of a contact position between said thermal transfer head and the platen along the paper carrying direction and a second recording paper carrier roller exerting carrying force upon the recording paper at the downstream side of the same;
- a first sensor for detecting the recording paper disposed on the upstream side of said first recording paper carrier roller along the paper carrying direction;
- a second sensor for detecting the recording paper disposed on the downstream side of said second paper carrier roller along the paper carrying direction; and
- a control unit which controls the driving of said first and second paper carrier rollers in such manner as: carrying the recording paper in the forward direction in response to detection of the recording paper by said first sensor when printing on one page of the recording paper is started; performing subsequent processes on the assumption that the recording paper is set in the initial position when said second sensor detects the recording paper during the carrying of the according paper in the forward direction; and stopping the carrying of the recording paper when said second sensor detects absence of the recording paper during the carrying of the recording paper in the reverse direction after completing the printing on said recording paper in one color.

2. A thermal transfer printer as set forth in claim 1, wherein said platen is used as said first recording paper carrier roller.

3. A thermal transfer printer, for color printing in which an ink sheet having ink of a plurality of sequential color faces and a recording paper are put one upon another and inserted into a contact position between the thermal transfer head and the platen so as to be subjected alternately to thermal transfer printing with each color having means for carrying in the forward direction and for carrying in the reverse direction, being provided with a first recording paper carrier roller exerting carrying force upon the recording paper at the upstream side of a contact position between said thermal transfer head and the platen along the paper carrying direction and a second recording paper carrier roller exerting carrying force upon the recording paper at the downstream side of the same;

a first sensor for detecting the recording paper disposed on the upstream side of said first recording paper carrier roller along the paper carrying direction;

a second sensor for detecting the recording paper disposed on the downstream side of said second paper carrier roller along the paper carrying direction;

a third sensor for detecting said printing start mark impressed on the recording paper, disposed between said first carrier roller and said first sensor; and a control unit which controls the driving of said first and second paper carrier rollers in such manner as: carrying the recording paper in the forward direction in response to detection of the recording paper by said first sensor when printing on one page of the recording paper is started; performing subsequent processes on the assumption that the recording paper is set in the initial position when said third sensor detects said mark after said second sensor detects the recording paper during the carrying of the recording paper in the forward direction; and stopping the carrying of the recording paper when said second sensor detects absence of the recording paper during the carrying of the recording paper in the forward direction after completing the printing on said one page of the recording paper.

4. A thermal transfer printer as set forth in claim 3, wherein said platen is used as said first recording paper carrier roller.

* * * * *